(12) United States Patent
Narayanan et al.

(10) Patent No.: US 8,175,223 B2
(45) Date of Patent: May 8, 2012

(54) INTELLIGENT SELF-HEALING NETWORKS AND ADVANCED TROUBLESHOOTING OF COMMUNICATION SERVICE PROBLEMS

(75) Inventors: Shankaran Narayanan, Atlanta, GA (US); Mounire El Houmaidi, Atlanta, GA (US); Homayoun Torab, Snellville, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1501 days.

(21) Appl. No.: 11/612,808

(22) Filed: Dec. 19, 2006

(65) Prior Publication Data
US 2008/0192639 A1 Aug. 14, 2008

(51) Int. Cl.
*H04M 1/24* (2006.01)
(52) U.S. Cl. .............. 379/22.03; 379/27.01; 379/27.08
(58) Field of Classification Search ............... 379/22.03, 379/9.01–9.06, 15.01–15.05, 26.01–26.02, 379/27.01–27.08, 29.01–29.09, 32.01–32.05
See application file for complete search history.

(56) References Cited

U.S. PATENT DOCUMENTS
5,953,389 A * 9/1999 Pruett et al. ................. 379/9
7,693,079 B2 * 4/2010 Cerami et al. ............ 370/241.1
* cited by examiner

*Primary Examiner* — Melur Ramakrishnaiah
(74) *Attorney, Agent, or Firm* — Hope Baldauff Hartman, LLC

(57) ABSTRACT

A problem detection and repair system receives a trouble indication indicating a problem with a network. The trouble indication may be the result of automated monitoring of the network, or a user of communication services contacting an operator of the network to report trouble. Communication services may include telephone service, television service, Internet service, and other services delivered via a network. The trouble indication may be paired with the user's account, and one or more status determinations may be made prior to handing the user to a support person. Based on the results of the status determinations, problems may be detected, and repairs automatically attempted. If needed, the user may be forwarded to a support person along with the results of the status determinations and any attempted repairs.

19 Claims, 4 Drawing Sheets

INTELLIGENT SELF-HEALING NETWORKS AND ADVANCED TROUBLESHOOTING OF COMMUNICATION SERVICE PROBLEMS

TECHNICAL FIELD

This application relates generally to communications networks. More particularly, this application relates to troubleshooting customer problems with communication services.

BACKGROUND

Modern communication networks have enabled a variety of network services which run the gamut of services, from entertainment-related to business-related. When users have problems with their communication services, the users may individually initiate a trouble communication to their service provider. The trouble communication may be a phone call to a technical support line, for example. A typical trouble communication may involve a user calling a technical support phone number. After an initial authentication, the user may wait on hold for the next available support person. Once connected to a support person, the support person will spend some time discussing the problem with the user. The support person may then perform diagnostic tests and queries on hardware and software affecting the user's communication services. The support person then attempts to solve any problems, or possibly escalate the problem to a more senior support person.

Ultimately, the process outlined above may take significant time and resources. Time spent by a support person can be expensive, especially when costs other than wages are considered, such as computer hardware, training, and so forth. In addition, time spent by a user waiting on hold for a support person can waste the user's time and cause frustration. For major outages, existing systems may automatically inform a user that an outage is being experienced in one or more areas, preventing the user from taking valuable time away from a support person. However, these systems frequently require manual intervention to perform data collection, correlation, and update the automated notification system.

SUMMARY

It should be appreciated that this Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to one or more embodiments described herein, methods and systems provide for detecting and repairing problems with services received via a network. When a user contacts a support system, one or more associated communication services are determined. A status determination is initiated that is associated with the communication service, and following that forwarding information about the problem to a support person. If available, results of the status determination are forwarded to the support person. Also if possible, attempts may be made to repair any problems detected by the status determination.

According to additional embodiments, methods provide for receiving an identifier of a user of communication services and initiating a set of status determinations associated with the communication services. Once results are received, they are used to identify any problems with the communication services, which may then be forwarded to a support person. If possible, attempts may be made to repair the problem prior to forwarding the user to the support person.

Other systems, methods, and/or computer program products according to embodiments will be or become apparent to one with skill in the art upon review of the following drawings and Detailed Description. It is intended that all such additional systems, methods, and/or computer program products be included within this description, be within the scope of the present invention, and be protected by the accompanying claims.

DETAILED DESCRIPTION

Figure 1:
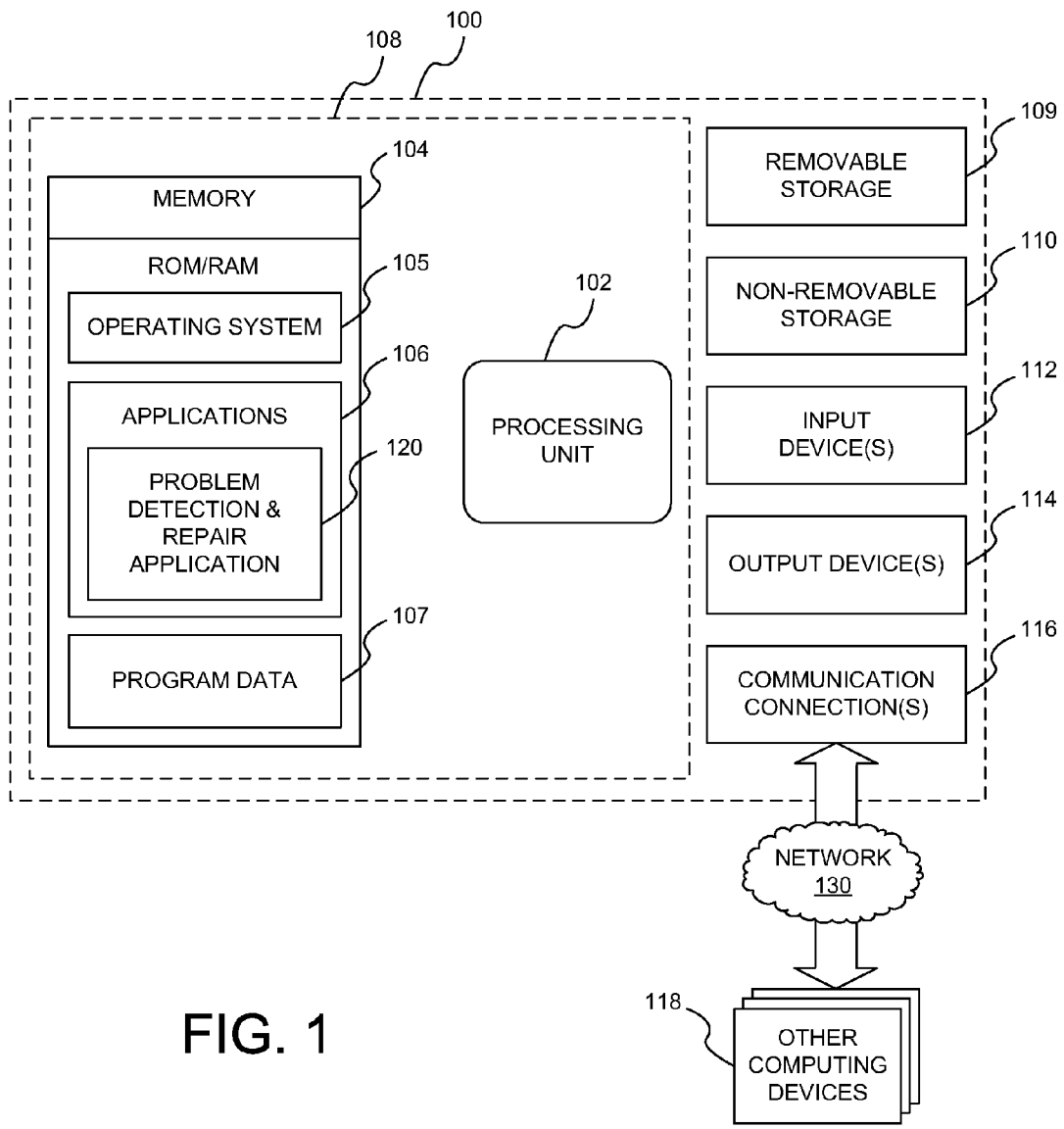
FIG. 1 is a block diagram illustrating an example of a computing device in which one or more embodiments may be implemented.

The following detailed description is directed to methods and systems for detecting and repairing service problems in a network. In the following detailed description, references are made to the accompanying drawings that form a part hereof, and which are shown, by way of illustration, using specific embodiments or examples. Referring now to the drawings, in which like numerals represent like elements through the several figures, aspects of the methods and systems provided herein will be described.

FIG. 1 and the following discussion are intended to provide a brief, general description of a suitable computing environment in which embodiments of the invention may be implemented. While embodiments of the invention will be described in the general context of program modules that execute in conjunction with an application program that runs on an operating system on a computer system, those skilled in the art will recognize that other embodiments of the invention may also be implemented in combination with other program modules.

Generally, program modules include routines, programs, components, data structures, and other types of structures that perform particular tasks or implement particular abstract data types. Moreover, those skilled in the art will appreciate that embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a network. In a distributed computing environment, program modules may be located in both local and remote memory storage devices.

With reference to FIG. 1, embodiments of the invention may include a computing device, such as the computing device 100. In a basic configuration 108, the computing device 100 includes at least one processing unit 102 and a memory 104. The processing unit 102 may include one or more microprocessors, microcontrollers, co-processors, field programmable gate arrays (FPGAs), complex programmable logic devices (CPLDs), application specific integrated circuits (ASICs), and other devices capable of executing the methods and operations set forth below. Depending on the configuration of the computing device 100, the memory 104 may be volatile (e.g., Random Access Memory (RAM)), non-volatile (e.g., Read-Only Memory (ROM), flash memory), or some combination thereof. The memory 104 serves as a storage location for an operating system 105, one or more applications 106, and may include program data 107, as well as other programs. In various embodiments, the applications 106 include a problem detection and repair application 120, an application including similar logic, or any other set of instructions comprising such logic. It should be noted that the logic of the problem detection and repair application 120 may be distributed and/or shared across multiple devices, including computing device 100. More information regarding the function of the problem detection and repair application 120 is provided below.

The computing device 100 may include additional features and functionality other than the features shown within dashed-line box 108. For example, the computing device 100 may include additional data storage components, including both removable storage 109 (e.g., floppy disks, memory cards, compact discs (CDs), digital video discs (DVDs), external hard drives, universal serial bus (USB) drives and non-removable storage 110 (e.g., magnetic hard drives).

Computer storage media may include media implemented in any method or technology for storage of information, including computer readable instructions, data structures, program modules, or other data. The memory 104, the removable storage 109, and the non-removable storage 110 are all examples of computer storage media. Further examples of computer storage media include RAM, ROM, electrically-erasable programmable ROM (EEPROM), flash memory, CD-ROM, DVD, cassettes, magnetic tape, and magnetic disks. Any such computer storage media may be accessed by components which are a part of the computing device 100, or which are external to the computing device 100 and connected via a communications link (e.g., Bluetooth®, USB, parallel, serial, infrared). The computing device 100 may also include one or more input devices 112 for accepting user input. Examples of the input devices 112 include a keyboard, mouse, digitizing pen, microphone, touchpad, touch-display, and combinations thereof. Similarly, the computing device 100 may include output devices 114 such as video displays, speakers, printers, and combinations thereof. It should be understood that the computing device 100 may also include additional forms of storage, input, and output devices. The input devices 112 and the output devices 114 may include communication ports and associated hardware for communicating with external input and output devices rather than including the devices within the computing device 100.

The computing device 100 includes one or more communication connections 116 that include hardware and/or software which enable the computing device 100 to communicate with other communications or computing devices 118 over a network 130. The network 130 may include a wireless network such as, but not limited to, a Wireless Local Area Network (WLAN) such as a WiFi network, a Wireless Wide Area Network (WWAN), a Wireless Personal Area Network (WPAN) such as Bluetooth®, a Wireless Metropolitan Area Network (WMAN) such as a WiMAX network, a cellular network, and/or a satellite network. Alternatively, the network 130 may include a wired network such as, but not limited to, a cable television network, a telecommunications network, a wired Wide Area Network (WAN), a wired Local Area Network (LAN) such as the Ethernet, a wired Personal Area Network (PAN), and/or a wired Metropolitan Area Network (MAN). The network 130 may also include any combination of the network varieties described above. Communication media, in the form of computer readable instructions, data structures, program modules, or other data in a modulated data signal, may be shared with and by the computing device 100 via the communication connection 116. Modulated data signal may mean a signal that has one or more of its characteristics set or changed in such a manner as to encode information in the signal, and may include a modulated carrier wave or other transport mechanism.

Figure 2:
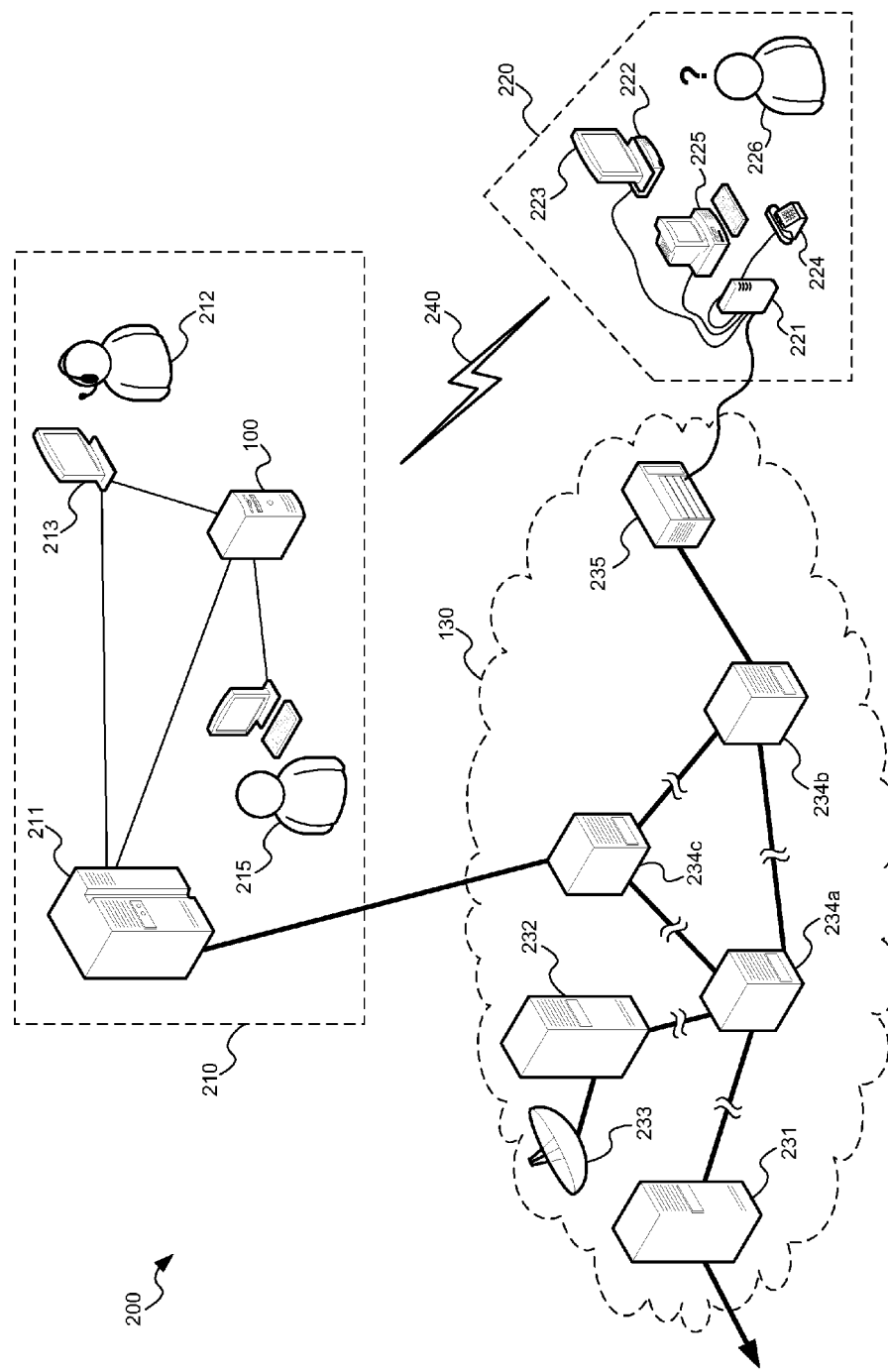
FIG. 2 depicts a communication service problem detection and repair system according to embodiments.

Turning now to FIG. 2, depicted is a communication service problem detection and repair system 200 according to embodiments. Depicted are network and network-connected hardware devices, variously associated with a service provider 210, a user's premises 220, and the network 130. A user 226 may take advantage of one or more network or communication services. Network or communication services may include Internet services for a computer 225, Internet Protocol Television (IPTV) services via a set top box 222 displayed on a television 223, and wired telephone services (e.g., conventional or voice over IP (VOIP)) for a telephone 224. Other communication services not shown include wireless telephone services, music delivery, and other services capable of being provided via the network 130. Some or all of the communication services may be provided via a customer premise equipment (CPE) 221, which may include a device integrating the functionality of a digital subscriber line (DSL) modem, a cable modem, a dial-up modem, a wireless gateway, a wireless router, and other devices useful for translating and/or delivering communication services.

The communication services associated with the user 226 are delivered via network 130, which may include a variety of devices. The CPE 221, and any other devices, may connect to the network 130 through one or more access nodes, such as access node 235, for example. The access node 235 may include a digital subscriber line access multiplexer (DSLAM), a digital switch, a router, or any other device having aggregation functionality. The access node 235 may connect with a network node 234b via a high speed signaling standard, including asynchronous transfer mode (ATM) or Gigabit Ethernet (GE), for example. Additional network nodes 234a, 234c and the network node 234b may be connected to each other directly or indirectly using similar standards and pass data among each other, the data constituting in part the communication services for use by the user 226 and other users. Each of the network nodes 234a, 234b, 234c may include one or more routers for directing packet-based data among the several nodes. The network node 234a may also be connected to an edge device 231, which may include a provider edge router (PER) for transferring data and communication services to and from other providers. The network node 234a may also be indirectly connected to a video server 232, such as an acquisition server, which may be responsible for converting a video signal, such as might be received via a satellite dish 233, into a digitized packet stream, possibly compressing the signal using a Motion Picture Experts Group (MPEG) standard. Video packets may then be delivered via the nodes 234a, 234b, 234c and the access node 235 to the CPE device 221 and on to the IPTV set top box 222 for decompression and display on the television 223.

When the user 226 experiences problems with the user's communication services, the user 226 may initiate a trouble communication 240 with the service provider 210. The trouble communication 240 may be initiated by a wired or wireless telephone call to a help desk, an instant message, a simple message service (SMS) message, a video conference, an email message, a web page, or any other method for initiating communication with the service provider 210. For example, if the television channel that the user 226 is watching goes blank or the image degrades suddenly, the user 226 may use the telephone 224 to initiate a trouble communication, such as the trouble communication 240 using a technical support phone line of the service provider 210. The trouble communication 240 may initially be routed through the computing device 100 which may include an interactive voice response (IVR) application and the problem detection and repair application 120. For other types of trouble communications (e.g., SMS message or web-based), other types of applications capable of receiving and processing the trouble communication 240 may be used to communicate with the user 226.

The problem detection and repair application 120 may utilize other types of trouble indications other than the trouble communication 240 from the user 226. For example, monitoring software may run on one or more servers such as a server 211. The monitoring software may receive automated indications from elements within the network when the elements detect a problem. For example, if the CPE 221 or some other element of the network 130 detects a problem with the quality of service (QoS) of data packets, it may inform the monitoring software of the problem. As another example, if the acquisition server 232 detects a problem with the acquisition of streaming media, causing service degradation, the acquisition server may inform the monitoring software of the problem. Likewise, the monitoring software may proactively test and/or otherwise analyze elements of the network 130, or request updated status information. When the monitoring software detects or is notified of a problem, the problem detection and repair application 120 may receive a trouble indication from the monitoring software.

The computing device 100 may also include an outage notification system (ONS) application, which is further discussed below. The applications may also run from other computing devices, separate from the computer device 100. The applications on the computing device 100 may handle initial authentication of the user 226 and associate the user 226 with an account identifier or other identifier. The ONS application may inform the user 226 about any current outages which may affect the communication services provided to the user 226. The problem detection and repair application 120 may attempt to detect and repair any communication service problems before forwarding the trouble communication to support person 212 if needed. In detecting and repairing any communication service problems, the problem detection and repair application 120 may use a set of business rules created or modified by a technical expert 215. The business rules may take network status information and other inputs such as user reported problems and determine one or more likely causes of a problem as well as determine potential fixes for the problem. More information regarding the particulars of the problem detection and repair application 120 is provided below.

The support person 212 may then use a terminal 213 to ascertain information about the user 226 and/or any communication service problems reported in the trouble indication. The support person 212 may receive the results of any queries, diagnostics, or attempted repairs performed by the problem detection and repair application 120 and, in the case of a user-initiated trouble indication, use the information to discuss any additional problem symptoms with the user 226 and also access the NMS running on the server 211 to further diagnose any problems. If no problems are detected on the network 130, the support person 212 may assist the user 226 diagnosing a problem on the premises of the user 226 and/or in scheduling a technician to come to the home of the user 226. Other problems which do not relate directly to the network 130 may also be analyzed and solved by the support person. For example, all services may be fine, but a bill was misprinted or misdelivered, or the service selections for the user 226 may be incorrect.

Figure 3:
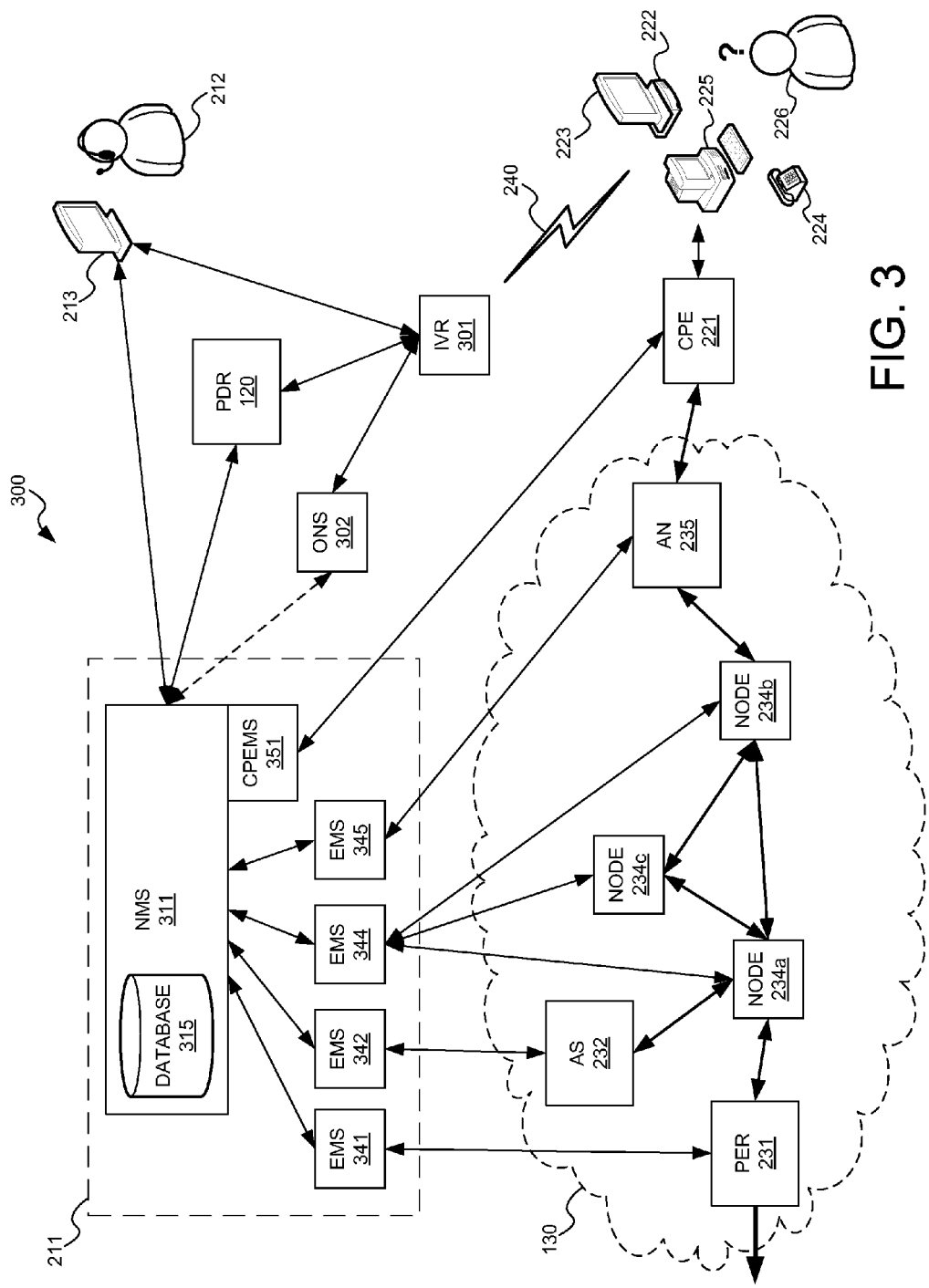
FIG. 3 depicts a communication service problem detection and repair system according to embodiments.

Turning to FIG. 3, a depiction of a communication service problem detection and repair system 300 according to embodiments will now be described. The communication service problem detection and repair system 300 is similar to that demonstrated by the communication service problem detection and repair system 200 of FIG. 2. FIG. 3 depicts a wide variety of program modules and applications running on the various hardware devices of an embodiment, in addition to some of the communications among the program modules.

If the user 226 initiates the trouble communication 240 with the service provider, a voice call may be handled initially by an IVR application 301 on computing device 100. Other types of trouble indications may utilize alternative applications. For example, a trouble indication from an element of the network 130 may be handled by monitoring software running on a server 211, or a web-based or instant message-based trouble communication 240 from the user 226 may be handled by a web server or message server application (not shown). In the case of a voice call from the user 226, the IVR application 301 may authenticate the user and determine an account identifier using caller ID information accompanying the incoming call, an entered account number, or other methods for identifying the account of the user 226. Initially, the user 226 may be provided information from an outage notification system (ONS) 302, including, for example, the names of counties, cities, neighborhoods, and other geographies or services affected by temporary outages. The information utilized to provide temporary outage information may be manually or automatically correlated and extracted from the NMS 311, and inputted into the ONS 302. The ONS 302 may simply provide a list of all geographies currently affected by outages, or it may selectively notify the user 226 of an outage specifically affecting his geography and/or communication services, if any. The ONS 302 may also reside in the computing device 100.

The NMS 311 may be housed on one or more servers 211, which may also house one or more databases 315 compiling an inventory of network elements, an inventory of network services, service information, service level agreements (SLAs) or other contracts, customer priority information, business rules, and information about faults or problems experienced in a network, such as the network 130. One or more servers 211 may also house monitoring software for monitoring problems on the network 130. The NMS 311 may work with multiple program modules, such as the element management systems (EMSs) 341, 342, 344, 345 and the customer premise equipment management system (CPEMS) 351 in order to communicate with elements of the network 130. Some of the EMS modules 341, 342, 344, 345 may be adapted to communicate in a vendor-specific fashion with elements of the network 130 (e.g., the access node 235, the nodes 234a, 234b, 234c, the provider edge router 231, and acquisition server 232), enabling the retrieval of status information about each element and enabling other commands. The CPEMS module 351 may communicate with customer premise equipment (CPE) 221 over the network 130 utilizing a CPE communication standard such as TR-069.

Following any information provided by the ONS 302, the user 226 may be placed in a queue to wait for the next available support person 212. During the wait, or before being placed in the queue, the account identifier of the user 226 or another identifier may be provided to the problem detection and repair application 120. The identifier may be provided even earlier in the course of the trouble communication 240. Regardless of when the identifier is provided to the problem detection and repair application 120, the processes performed by the problem detection and repair application 120 may be performed as a background operation having necessarily no discernable affect on the trouble communication 240 until results, if any, are produced. Alternatively, the user 226 may be notified when the problem detection and repair application 120 begins its processes.

The problem detection and repair application 120 utilizes the provided account identifier with the user 226 to access account information of the user, to begin determining one or more statuses for the collection communication services subscribed to by the user 226, which may also be described as the user's service map. The problem detection and repair application 120 may initiate one or more status determinations, which may include diagnostic queries or tests, depending on the services identified in the service map. Diagnostic queries and/or tests may be initiated at the NMS 311, which may then execute diagnostics on individual elements via the EMS modules 341, 342, 344, 345 and/or via the CPEMS module 351. Alternatively, status determinations initiated by the problem detection and repair application 120 may simply trigger the NMS 311 to query the database 315 storing collected diagnostic results. The results of any diagnostic queries and/or tests may provide a snapshot or current state of the system map. By comparing the current state of the system map to an expected state, particular problems can be detected. The expected state may be stored locally by the problem detection and repair application 120, stored in the database 315, or constructed dynamically based on typical service levels for a particular service map.

If the problems are repairable by the problem detection and repair application 120, then the application 120 may attempt to initiate a repair. Determining whether a problem is repairable may involve consulting a list of repairable problems which may be updated as new repairs are added to the problem detection and repair application 120. A determination of whether or not a problem is repairable may be made dynamically utilizing business rules created or modified by the domain expert 215. The business rules may enable the problem detection and repair application 120 to infer or formulate possible repairs, especially when utilized in conjunction with information stored about previously encountered problems and their ultimate solutions. If the repair attempt is successful, then the user 226 may be presented with an option to end the trouble communication 240 without communicating with the support person 212. If repairs are not available, or the repair attempt is unsuccessful, then the information gathered by the problem detection and repair application 120 may be forwarded to the support person 212. Having the information gathered by the problem detection and repair application 120 may save the support person 212 time spent on the trouble communication 240. Additional details regarding the functionality of the problem detection and repair application 120 will be further discussed below.

Figure 4:
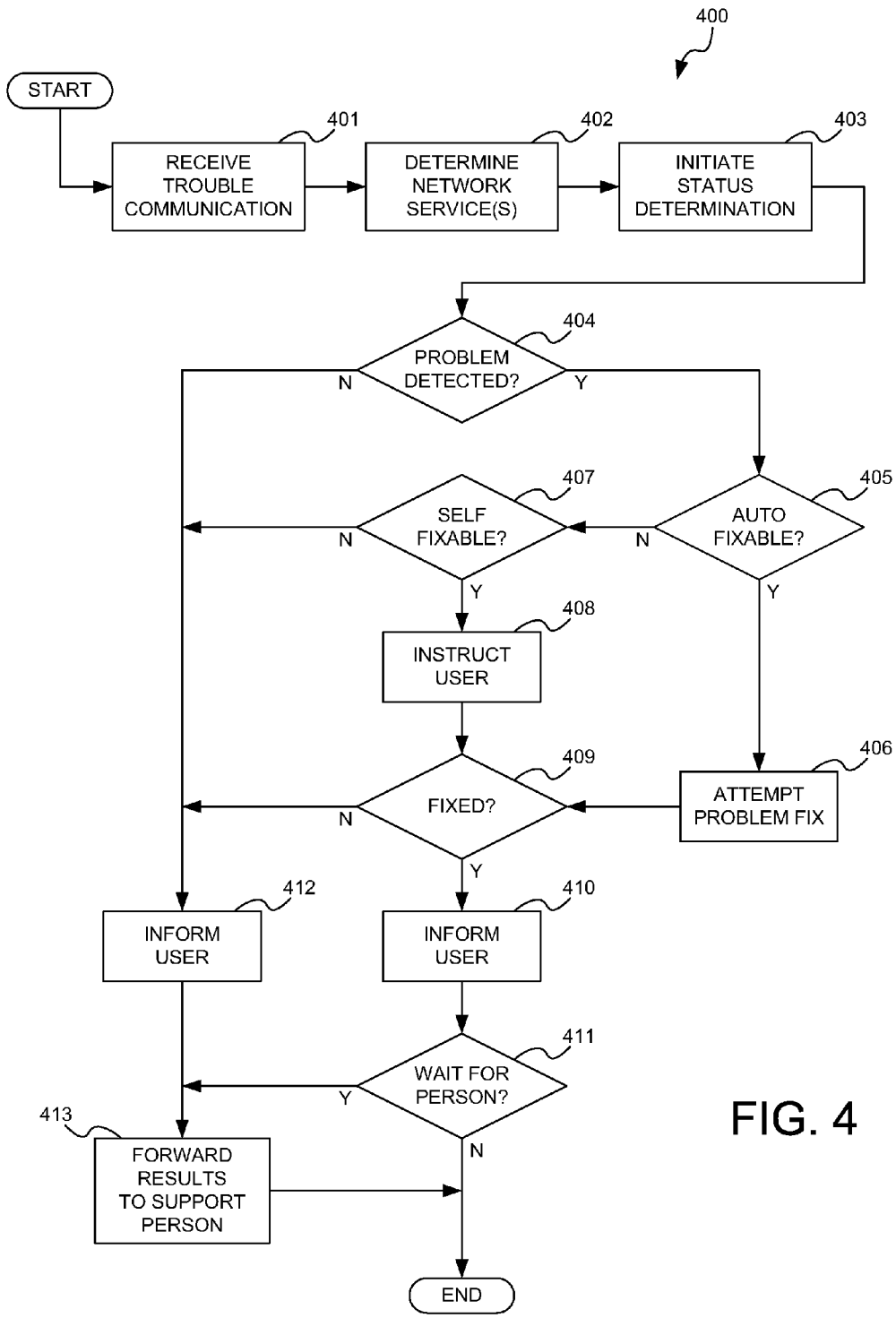
FIG. 4 is a flowchart depicting a process for detecting and repairing problems with communication services according to one or more embodiments.

Turning now to FIG. 4, a flowchart depicting a process 400 for detecting and repairing problems with communication services is described. The process 400 may be implemented on one or more computing devices, such as the computing device 100, and may be used by embodiments of the problem detection and repair application 120. The logical operations of the various implementations presented may be (1) a sequence of computer implemented acts or program modules running on one or more computers, such as the computing device 100, and/or (2) interconnected machine logic circuits or circuit modules within the computing device 100. The implementation is a matter of choice dependent on the performance requirements of the computing device 100 on which the embodiments are implemented. Accordingly, the functional operations making up the implementations are referred to variously as operations, structural devices, acts, or modules. It will be recognized by one skilled in the art that these operations, structure devices, acts, and modules may be implemented in software, in firmware, in special purpose digital logic, and/or any combination thereof without deviating from the spirit and scope of the attached claims. Moreover, it will be apparent to those skilled in the art that the operations described may be combined, divided, reordered, skipped, and otherwise modified, also without deviating from the spirit and scope of the attached claims.

The process 400 begins at operation 401 when a trouble indication, such as the trouble communication 240, is received either from the user 226 who is having a problem with one or more communication services or from automated monitoring. At operation 402, the problem detection and repair application 120 determines a set of potentially affected communication services. This may include the service map of communication services subscribed to by the user 226. The problem detection and repair application 120 may determine the communication services by consulting a local or remote database, such as the database 315, which may store an account identifier associated with the user 226, along with a list of communication services associated with the account identifier.

Based on the determined set of communication services, at operation 403, the problem detection and repair application 120 initiates one or more status determinations to check for problems in the network 130. The status determinations may be in the form of one or more requests made to the NMS 311. The requests may initiate new tests of the network elements affecting the communication services of the user 226. The tests may simply be diagnostics to determine whether every circuit and/or element of the network 130 affecting the communication services of the user 226 is functioning properly. Tests may include a status check of the CPE 221, a permanent virtual circuit (PVC) check, a Password Lockout status, a Traffic Flow status, a quality of service (QoS) status, an authentication status, and other tests available for determining a current status of one or more communication services. The requests made by the problem detection and repair application 120 may alternatively retrieve the most-recently collected status information as may be stored in the database 315 and accessed via the NMS 311. The status determinations may alternatively or additionally be made based on information in the initial trouble communication. This may include information such as problem information accompanying the trouble indication.

At decision 404, the problem detection and repair application 120 determines if a problem was detected during the status determination. To determine if a problem was detected, the problem detection and repair application 120 may compare the current state of the communication services to the expected state. The comparison may further be made by the NMS 311. If no problems are detected, then if the trouble indication was initiated by the user 226 at decision 409, the fact that no problems in the network 130 were found may be relayed to the user 226 at operation 410. The user 226 may be informed by the problem detection and repair application 120 directly, by forwarding the information to the IVR 301 for audio announcement to the user 226. Additional information may be provided to the user 226 regarding in-premises troubleshooting, and scheduling a technician to perform in-premises repairs. If the user 226 chooses at decision 411 to wait for a support person, the user 226 is forwarded, along with information about the requests and results, to the support person 212 at operation 413, possibly for further queuing. If the trouble indication was not initiated by a user 226, then the fact that no problem was detected may be relayed along with status determination results to a support person for review and/or further handling at operation 413.

If, at decision 404, a problem in the network 130 was detected, then at decision 405, the problem detection and repair application 120 determines whether the problem is automatically fixable. To make this determination, the problem detection and repair application 120 may consult a list of fixable problems, which may be stored locally. The problem detection and repair application 120 may utilize a series of business rules which analyze the results of any status determinations to intelligently pinpoint a possible problem and determine any potential fixes for the problem. If the problem is fixable in an automated fashion, then at operation 406, the problem detection and repair application 120 attempts to fix the problem. For example, if the user 226 failed to enter the proper password for point to point protocol over Ethernet (PPPoE) multiple times, the user may be locked out. The problem detection and repair application 120, upon receiving information that the password has been locked out, may request a password reset, or otherwise initiate a fix for the problem. The reset password may, for example, be set to a designated set of characters that only the user 226 would know. Other automated fixes may include resetting or restarting a malfunctioning network element, rerouting data packets, and other communication service fixes which can be automated.

If, at decision 405, the problem does not have an automated fix, then it may be checked to see if there is a fix that the user 226 can perform his or herself at decision 407. For example, if the NMS 311, communicating via the CPEMS 351, cannot contact the CPE 221 inside the customer's premises, but is able to contact all the other elements, including access node 235, then the fix for the problem may involve the customer simply resetting or plugging in the CPE 221. The problem detection and repair application 120 may determine whether the problem is fixable by the user 226 by consulting a list of self-fixable problems stored locally. Other methods for determining whether a problem is fixable by the user 226 may be utilized, including the use of business rules to determine a location and/or severity of a problem and/or to assess the technical skill of the user 226. At operation 408, the user 226 may be instructed using audio, visual, and/or textual messages as to how to make the repair his or herself. For example, the user 226 may be told to unplug the power cable of the CPE 221 and then plug it back in. If at decision 407, the fix for the problem is neither auto- nor user-fixable and the process was user initiated at decision 409, then at operation 410, the user 226 is informed that a problem was found and that the information will be forwarded to the support person 212 at operation 413 if the user 226 decides to wait for the support person at decision 411.

If a fix was attempted, either auto or self, then at operation 412, the problem detection and repair application 120 confirms whether the fix was successful. This confirmation may require requesting an updated status from the NMS 311 and/or prompting the user 226 to respond as to whether the problem had been fixed by, for example, selecting particular buttons or by voice response on a telephone call. If the process was user-initiated at decision 409, the user 226 at operation 410 may then be informed that a problem was found, and that the fix appears to have been successful or unsuccessful. According to various embodiments, the user 226 may be informed of the cause of the problem as well as the solution. At decision 411, the user 226 may be prompted to determine whether they wish to continue to wait for the support person 212. If so, at operation 413, the results of any status determinations and successful or failed fixes will be forwarded on to the support person 212. If the user 226 is satisfied with the repair, then the process 400 terminates normally, and the user 226 ends the communication. If the user 226 wishes to wait for the support person 212, then at operation 413, information about the problems and attempted repairs is forwarded to the support person 212.

If the fix attempt was found to be unsuccessful at decision 409, then information about problems and failed fix attempts may be forwarded at operation 413 to the support person 212.

Although the subject matter presented herein has been described in conjunction with one or more particular embodiments and implementations, it is to be understood that the invention defined in the appended claims is not necessarily limited to the specific structure, configuration, or functionality described herein. Rather, the specific structure, configuration, and functionality are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method for detecting and repairing a problem associated with delivery of a communication service over a network, the method comprising:
   receiving, at a processing unit, a trouble indication indicating trouble affecting a network;
   determining, at the processing unit, the communication service associated with the trouble affecting the network;
   initiating, a status determination associated with the communication service;
   determining, at the processing unit, that a result of the status determination indicates a problem associated with the communication service;
   determining, at the processing unit, whether the problem is solvable by a user associated with the communication service, wherein determining whether the problem is solvable by the user comprises assessing a technical skill associated with the user; and
   providing, by the processing unit, a solution for the problem to the user if the problem is solvable by the user.

2. The method of claim 1, further comprising:
   receiving an identifier associated with the user of the network; and
   determining the communication service associated with the user of the network using the identifier.

3. The method of claim 2, wherein receiving the identifier associated with the user of the network comprises receiving an account identifier for an account associated with the user.

4. The method of claim 1, further comprising:
   prior to determining whether the problem is solvable by the user associated with the communication service, determining whether the problem is solvable without involving the user or a support person; and
   attempting, by the processing unit, to repair the problem if the problem is determined to be solvable without involving the user or the support person.

5. The method of claim 4, further comprising
forwarding the trouble indication to the support person if the problem requires involvement of the support person.

6. The method of claim 1, further comprising determining whether the solution for the problem provided was successful.

7. The method of claim 1, wherein receiving the trouble indication indicating trouble affecting the network comprises receiving a telephone call.

8. The method of claim 1, wherein initiating the status determination for the communication service comprises initiating a diagnostic test of a network element associated with the communication service.

9. The method of claim 1, further comprising making the result of the status determination available to a support person.

10. A system for detecting and repairing communication service problems, the system comprising:
a processing unit; and
memory coupled to the processing unit, the memory comprising instructions configured to enable the processing unit to perform a method comprising:
receiving a trouble indication indicating trouble affecting a network,
determining a communication service associated with the trouble affecting the network,
initiating a status determination associated with the communication service,
determining that a result of the status determination indicates a problem associated with the communication service,
determining whether the problem is solvable by a user associated with the communication service, wherein determining whether the problem is solvable by the user comprises assessing a technical skill associated with the user, and
providing a solution for the problem to the user if the problem is solvable without involving the support person and is solvable by the user.

11. The system of claim 10, wherein the processing unit is enabled to perform a method further comprising:
prior to determining whether the problem is solvable by the user associated with the communication service, determining whether the problem is solvable without involving the user or a support person; and
attempting to repair the problem if the problem is determined to be solvable without involving the user or the support person.

12. The system of claim 11, wherein the processing unit is enabled to perform a method further comprising
forwarding the trouble indication to the support person if the problem requires involvement of the support person.

13. The system of claim 10, wherein receiving the trouble indication indicating trouble affecting the network comprises receiving a telephone call.

14. The system of claim 10, wherein the processing unit is enabled to perform a method further comprising:
receiving an identifier associated with the user of the network; and
determining the communication service associated with the user of the network using the identifier.

15. The system of claim 14, wherein receiving the identifier associated with the user of the network comprises receiving an account identifier for an account associated with the user.

16. The system of claim 10, wherein the processing unit is enabled to perform a method further comprising making the result of the status determination available to a support person.

17. A computer-readable storage medium having computer-executable instructions stored thereon which, when executed by a computer, cause the computer to perform a method comprising:
receiving a trouble indication indicating trouble affecting a network;
determining a communication service associated with the trouble indication;
initiating a status determination associated with the communication service;
identifying a problem with the plurality of communication services service based a result of the status determination;
determining whether the problem is solvable by a user associated with the communication service, wherein determining whether the problem is solvable by the user comprises assessing a technical skill associated with the user; and
providing a solution for the problem to the user if the problem is solvable by the user.

18. The computer-readable storage medium of claim 17, wherein the computer-executable instructions cause the computer to perform a method further comprising:
prior to determining whether the problem is solvable by the user associated with the communication service, determining whether the problem is solvable without involving the user or a support person;
attempting a repair of the problem if the problem is determined to be solvable without involving the user or the support person;
determining whether the repair was successful; and
informing the user whether the repair was successful.

19. The computer-readable storage medium of claim 18, wherein the computer-executable instructions cause the computer to perform a method further comprising
forwarding the trouble indication and the result to the support person if the problem requires involvement of the support person.

* * * * *

UNITED STATES PATENT AND TRADEMARK OFFICE
CERTIFICATE OF CORRECTION

PATENT NO. : 8,175,223 B2
APPLICATION NO. : 11/612808
DATED : May 8, 2012
INVENTOR(S) : Shankaran Narayanan, Mounire El Houmaidi and Homayoun Torab It is certified that error appears in the above-identified patent and that said Letters Patent is hereby corrected as shown below:

In Claim 1, Column 10, Line 40, please add after "initiating" --, at the processing unit--.

In Claim 17, Column 12, Lines 24-25, please delete "plurality of" and "services".

Signed and Sealed this
Third Day of July, 2012

David J. Kappos
*Director of the United States Patent and Trademark Office*